United States Patent
Waters et al.

(10) Patent No.: US 6,783,567 B1
(45) Date of Patent: Aug. 31, 2004

(54) COMPOSITION AND METHOD FOR SOIL ACIDIFICATION

(76) Inventors: Joseph A. Waters, 41210 Hwy. 49, Oakhurst, CA (US) 93644; John P. Guerard, 1509 McPherson La., Bakersfield, CA (US) 93311

( * ) Notice: Subject to any disclaimer, the term of this patent is extended or adjusted under 35 U.S.C. 154(b) by 242 days.

(21) Appl. No.: 10/207,710

(22) Filed: Jul. 29, 2002

Related U.S. Application Data

(60) Provisional application No. 60/308,717, filed on Jul. 30, 2002.

(51) Int. Cl.[7] ............................................. C05F 11/02
(52) U.S. Cl. ............................................. 71/24; 71/31
(58) Field of Search ........................................ 71/24, 31

(56) References Cited

U.S. PATENT DOCUMENTS

| | | | |
|---|---|---|---|
| 4,743,287 A | * | 5/1988 | Robinson ....................... 71/12 |
| 5,698,001 A | * | 12/1997 | Keenportz ....................... 71/24 |
| 5,766,302 A | * | 6/1998 | Lefroy et al. ................... 71/28 |
| 5,888,803 A | * | 3/1999 | Starkey .................... 435/254.1 |
| 6,254,654 B1 | * | 7/2001 | Van Barneveld ................. 71/8 |
| 6,372,008 B1 | * | 4/2002 | Boote et al. .................... 71/63 |

FOREIGN PATENT DOCUMENTS

| | | | |
|---|---|---|---|
| CA | 2043873 | * | 10/1992 |
| WO | 87/00855 | * | 2/1987 |

\* cited by examiner

*Primary Examiner*—C. Sayala
(74) *Attorney, Agent, or Firm*—Sturm & Fix LLP

(57) ABSTRACT

A composition and method for soil acidification. The composition is provided in a sulfur humate granule. The granule includes elemental sulfur, micronized humate, and a binding agent wherein the ratio of micronized humate to sulfur is about 1:4. The granule is preferably applied to the soil in a band with other fertilizers.

7 Claims, 1 Drawing Sheet

COMPOSITION AND METHOD FOR SOIL ACIDIFICATION

CROSS REFERENCE TO RELATED APPLICATIONS

This application contains disclosure from and claims the benefit under Title 35 United States Code § 119(e) of U.S. Provisional Application S.N. 60/308,717 filed Jul. 30, 2002 entitled "PLANT/SOIL AMENDMENT NUTRIENT PASTILLE".

BACKGROUND OF THE INVENTION

1. Field of the Invention

The present invention relates to the field of soil treatment, and more particularly to a composition and method for soil acidification.

2. Description of Related Art

Acidification of the soil may be needed when soil pH is high, or when carbonates are present, as in semiarid and arid regions. When the pH is above about 7.5, the solubility of phosphorus and the metal micro-nutrients (iron, manganese, and zinc) are severely limited. In more humid regions, farmers may encounter soil alkalinity by over-liming soils, or may be tilling young soils with carbonates from the parent material.

Where carbonates are present in substantial amounts, the cost and amount of material needed to acidify the entire soil may be prohibitive. In such cases, acid forming materials are often banded with fertilizers. This creates a zone of acidification in perhaps 2% of the soil volume, where the solubility of the fertilizers is enhanced at much less cost than by acidifying the entire soil volume.

Of all the acidifying agents, elemental $S^0$ is the most effective per unit weight. For very mole of elemental $S^0$ applied and oxidized, 2 moles of $H^+$ are produced which decreases soil pH.

However, the oxidation rate of finely ground elemental sulfur is slow in cold, alkaline soils. Because of this, spring pre-plant applications of elemental sulfur in the fertilizer band do not effectively change pH by the time seedlings are needing the nutrients in the fertilizer band.

Sulfuric acid works quickly, but is dangerous to work with and requires the use of special acid-resistant equipment. In addition the rapid reaction with soils temporarily creates heat, very acidic conditions, and high salt concentrations, which can kill microorganisms in these zones.

Aluminum sulfate and iron sulfate also work quickly, but are quite expensive. In addition, soluble aluminum from the aluminum sulfate is toxic to plants.

Ammonium polysulfide, (APS), $NH_4S_x$ when applied, decomposes into ammonium sulfide colloidal $S^0$. The $S^0$ and $S^{2-}$ are then oxidized to $H_2SO_4$. Potassium polysulfide, (KPS) KS, behaves similarly. The amount of acidity generated is not as much, per unit weight applied, as for elemental sulfur. This material is an expensive source of acidity, unless nitrogen or potassium is also needed.

Ammonium thiosulfate ATS [$NH_4)_2S_2O_3$)] when applied to soil, forms colloidal $S^0$ and ammonium sulfate. The colloidal SO is oxidized to sulfuric acid by microbial processes.

Potassium thiosulfate, or KTS, behaves similarly. These materials do not generate as much acidity per unit weight compared to elemental sulfur, and are too expensive, unless nitrogen or potassium is also needed.

Ammoniated fertilizers will release small amounts of acidity in the soil, but only after the process of nitrification is complete; typically several weeks after soils have warmed in the spring. Where soils are not very alkaline, the effect of several years of nitrification of ammoniated fertilizers is a decline in soil pH.

The acidity from elemental sulfur ($S_8$) results from its oxidation in soil. Although elemental sulfur can be oxidized in the soil by inorganic chemical reactions, this process is usually much slower than microbial oxidation. The rate of biological sulfur ($S_8$) oxidation depends on the interaction of four factors:

1. The presence and diversity of species that oxidize sulfur;
2. The microbial populations of these species in the soil;
3. The physical and chemical characteristics of the S source; and
4. Soil environmental conditions, such as pH, temperature, aeration, and moisture content.

Two general classes of bacteria are involved in $S^0$ oxidation:

Chemoautotrophic S bacterial. This class utilizes energy released from the oxidation of inorganic S for the fixation of $CO_2$ into microbial biomass. The following general equation describes the process.

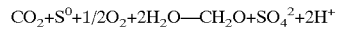
$$CO_2 + S^0 + 1/2O_2 + 2H_2O \rightarrow CH_2O + SO_4^{2-} + 2H^+$$

The most important group of S-oxidizing organisms are the chemoautrotrophic bacteria belonging to the genus Thiobacillus. These $S^0$ oxidizers are very active in most soil environments.

The second class of $S^0$ oxidizers occurs in the general population of heterotrophic organisms. Heterotrophic organisms get energy from the oxidation of organic matter. In some soils up to ⅓ of the total heterotrophic population are capable of converting $S^0$ to thiosulfate. The thiosulfate can then be oxidized to sulfate by Thiobacillus.

An increase in temperature increases the $S^0$ oxidation rate in soil, up to an optimum near 30 degrees C. Low springtime soil temperatures are one significant reasons for the slow rate of oxidation and release of acidity. The presence of soil moisture and sufficient aeration is also needed for high rates of sulfur oxidation.

Microorganisms responsible for $S^0$ oxidation require most of the same nutrients needed by plants, plus a few others. Soil organic matter is not essential for the activity of autotrophic S bacteria, but heterotrophic organisms require organic matter as a source of energy.

Carbon dioxide is required by autotrophic microorganisms to oxidize elemental sulfur to sulfuric acid.

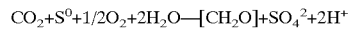
$$CO_2 + S^0 + 1/2O_2 + 2H_2O \rightarrow [CH_2O] + SO_4^{2-} + 2H^+$$

If carbon dioxide levels in soils are low, the rate of sulfur oxidation may be limited. Conditions where CO2 levels are low include low soil temperatures (reduced metabolic activity), low soil organic matter (fewer microorganisms), and crops in early stages of growth.

Considerable variability in $S^0$ oxidation rates among soils exists due to the differences in the number of thiobacillus and S oxidizing heterotrophs. Although the initial rate of S oxidation in laboratory studies can be greatly increased by inoculation with $S^0$ oxidizing organisms, these favorable effects of inoculation are frequently short lived under most conditions, and less benefit is usually obtained in field trials. The simple addition of $S^0$ to soil will encourage the growth of $S^0$ oxidizing microorganisms, modified by environmental factors.

Oxidized lignite is compressed humus, with a density close to lignite, but which has been oxidized by microorganisms and natural processes to the point where the resultant material has a structure and chemical activity that is much like the most humidified portion of soil organic matter.

Humic acids are the major extractable component of oxidized ignites. They have a dark brown to black color. Fulvic acids are present in smaller amounts in these materials, with a light yellow to yellow-brown color. Humin is the fraction of oxidized lignite that is not soluble at any pH, and are black in color. Oxidized lignites contain all three of these fractions, plus varying amounts of mineral matter, depending on its purity. In soils the fulvic acid and varying amounts of the humic acid fraction will dissolve into the soil solution. Heavier humic acids and the humin fraction will remain in the solid phase.

Oxidized ignites can be used to store and buffer both and nutrients and acidity in soils and livestock manure. The chemical basis for this buffer capacity is the cation exchange capacity (CEC) of a material. The cation exchange capacity of raw, ground oxidized ignites is very high varying from about 350 to 800 cmol (+) positive charge per kilogram of material, depending on the relative amounts and proportions of humic +fulvic acids in the material. For comparison, most soils have a CEC of 5–40 cmol (+)/kg. Since the native pH of most oxidized ignites is under 4.5, the majority of the exchange capacity is occupied by acidic cations. Oxidized lignite and its derivatives will complex phosphorus and metal micro nutrients, and increase both the nutrient availability and nutrient uptake of nitrate, phosphorus, and other plant nutrients.

Humic substances also affect a wide range of enzymatic processes, because fulvic acids and lighter fractions of humic acids are actively absorbed and translocated within plants. The effects of these fractions of oxidized lignite on biochemical processes in plants include changes in membrane permeability to nutrient ions, an indoleacetic acid (IAA) hormonal effect by inhibiting IAA-oxidase, and the inhibition and stimulation of several enzymes.

Solution culture, sand culture, soil pot studies and field trials using oxidized lignite and derivatives of humic substances have demonstrated that humic substances will increase root and shoot lengths and mass, number of lateral roots, root initiation, and seedling growth rate and yields. Humic substances may also stimulate the activity of soil microbes. Demonstrated positive effects on Rhizobium, and nitrifying bacteria have been recorded.

As a consequence of the foregoing, there has existed a longstanding need for a new and improved composition and method for soil acidification, and the provision of such is a stated objective of the present invention.

BRIEF SUMMARY OF THE INVENTION

Briefly stated, the present invention provides a composition and method for soil acidification. The composition is provided in a sulfur humate granule. The granule includes elemental sulfur, micronized humate, and a binding agent wherein the ratio of micronized humate to sulfur is about 1:4. The granule is preferably applied to the soil in a band with other fertilizers.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
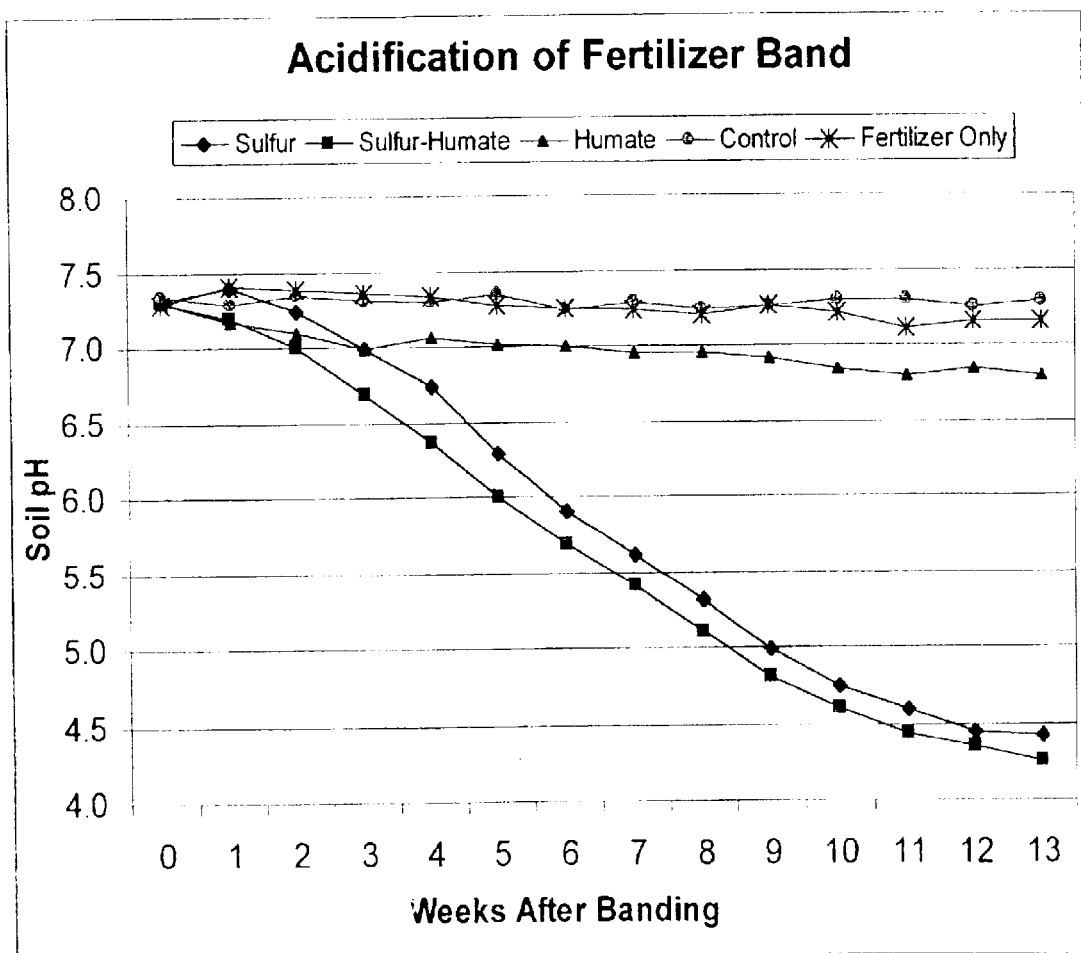
FIG. 1 is a graph showing comparative data relating to soil acidification using various soil treatments, including the composition and method of the present invention.

The composition that forms the basis of the present invention is a sulfur-humate granule. The oxidized lignite ingredient of the sulfur-humate granule is ground very finely, to an average particle size of 50 microns or less. This results in a great increase in surface area. The increased surface area allows for rapid dissolution and chemical activity in the soil. Micronizing the humate also allows for a greater proportion of it to be incorporated into the granule, without adversely affecting physical properties in its manufacture or use.

Bentonite is added to the micronized humate as a binding agent. The material is then mixed with molten sulfur to create a hot slurry. The slurry is forced through tubes, and drops out as discrete pellets, or granules, and is allowed to solidify by cooling. The resulting material has micronized oxidized lignite dispersed evenly throughout the sulfur. The ratio of micronized humate to sulfur is about 1:4, or one part micronized humate to four parts sulfur.

Although the material can be broadcast, it is best applied in a band with other fertilizer materials; especially those containing phosphorus or metal micronutrients.

As the granule imbibes water and the oxidized lignite begins to dissolve, the natural acidity in the humates is released and the pH drops. This reduction in pH will help increase the solubility of phosphorus and metal micro nutrients. In addition, the humic and fulvic acids released from the humate will form a soluble complex with phosphorus and metal micro nutrients. All of this happens before the oxidation of elemental sulfur has proceeded far enough to release significant amounts of acidity.

The humic and fulvic acids also stimulate the growth of plants and soil microorganisms. The respiration of plant roots and microbes increases, which means that more carbon dioxide is released. The more rapidly growing populations of sulfur-oxidizing microorganisms can utilize this carbon dioxide to oxidize and acidify the sulfur.

So the humate provides a quick, early release of acidity, forms soluble complexes with phosphorus and metal micronutrients, and stimulates the respiration and growth of microbes and plant roots. The sulfur-oxidizing bacteria can utilize the $CO_2$ from respiration to oxidize the elemental sulfur to sulfuric acid.

In soils with free carbonates (lime), an additional process occurs. When the humic and fulvic acids have dissolved out of the micronized humate, the immediate increase in acidity decomposes the lime to water and carbon dioxide.

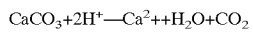

$$CaCO_3 + 2H^+ \rightarrow Ca^{2+} + H_2O + CO_2$$

The carbon dioxide released is now available for autotrophic S oxidizing bacteria to use in oxidizing the elemental S to sulfuric acid.

EXAMPLE 1

The hypothesis that the sulfur-micronized humate granules results in more rapid acidification in the soil surrounding the granules than elemental sulfur alone was tested. Soil of medium fertility and about 2.5% organic matter was collected. The pH of the soil was tested and found to be 7.3. Since the most efficient use of soil acidification agents is in the fertilizer band, conditions in a fertilizer band were replicated.

The following assumptions were used:
Assume 2% of the soil volume is occupied by fertilizer band. Thus rates of fertilizer additions per acre furrow slice were multiplied by 50 to achieve band concentrations in each pot.

The experimental treatment period ended 13 weeks later (Dec. $8^{th}$).

The average pH for all 5 pots in each treatment over each week of the treatment period is listed in Table 1 below.

TABLE 1

The pH of the Soil or Fertilizer Band

| Treatment | Week | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| Sulfur | 7.32 | 7.40 | 7.24 | 6.99 | 6.73 | 6.28 | 5.90 | 5.62 | 5.31 | 4.99 | 4.75 | 4.59 | 4.44 | 4.42 |
| Sulfur-Humate | 7.30 | 7.19 | 7.00 | 6.69 | 6.36 | 6.00 | 5.69 | 5.41 | 5.11 | 4.81 | 4.60 | 4.44 | 4.35 | 4.25 |
| Humate | 7.30 | 7.16 | 7.09 | 6.99 | 7.06 | 7.01 | 7.00 | 6.95 | 6.95 | 6.92 | 6.84 | 6.79 | 6.84 | 6.79 |
| Control | 7.34 | 7.29 | 7.35 | 7.31 | 7.30 | 7.35 | 7.25 | 7.29 | 7.24 | 7.26 | 7.31 | 7.30 | 7.26 | 7.29 |
| Fertilizer Only | 7.29 | 7.40 | 7.39 | 7.36 | 7.34 | 7.28 | 7.26 | 7.25 | 7.21 | 7.26 | 7.21 | 7.11 | 7.16 | 7.16 |

A graph of the data in Table 1 is shown in FIG. 1.

An Acre Furrow Slice (AFS)=one acre of soil 7" deep= about 2,000,000 pounds.

Treatments
Control
Fertilizer only
Fertilizer plus sulfur (100 lbs/AFS in fertilizer band)
Fertilizer plus humate (¼" chip minus—100 lbs/AFS put into a fertilizer band)
Fertilizer plus sulfur-humate pastilles (100 lbs/AFS put into a fertilizer band)
Fertilizer added was urea @ 86 lbs/AFS; monoammonium phosphate @ 38 lbs/AFS and potassium chloride @ 65 lbs per AFS
Calculations Weight of soil in each pot = 1.5 kg
100 lbs/acre for humate, sulfur and sulfur-humate pastilles
= 5000 lbs/acre concentration in a fertilizer band
= 3.75 g per pot;

All treatments have the following nutrients added to the band:

Urea - 86 lbs per acre
= 4300 lbs per AFS in the band
= 3.23 g per pot
11-52-0 - 38 lbs per acre
= 1900 lbs per AFS in the band
= 1.43 g per pot
0-0-62 - 65 lbs per acre
= 3250 lbs per AFS in the band
= 2.44 g per pot On Sep. 15, 2001 the treatments were added to soils, and the pots were placed in a cold frame for incubation. The soil in each pot was sampled, and measured for pH on a weekly basis.

The cold frames were partially opened during the day, if sunny, and fully closed at night. The high temperatures recorded inside the cold frame during the experimental period averaged about 20 degrees above the average high ambient air temperatures listed below: Late September 69/33; October 61/25; November 46/13; early December 38/5

From FIG. 1, it can be seen that the onset of acidification is already underway after one week for the sulfur-humate treatment, compared to the sulfur-only treatment, which did not show measurable acidification until the third week. The humate provides some immediate acidity, and also stimulates the activity of microorganisms, including those that oxidize elemental sulfur to sulfuric acid.

This two week jump on the lowering of pH of the fertilizer band with sulfur-humate treatment over the sulfur only treatment resulted in average pH levels to be 0.2 pH units lower than for the sulfur only treatment over the course of the 13 week treatment period.

Statistical Analysis

Statistical analysis of the date was performed using Statistix v.4.0, and MS Excel 97.

TABLE 2

ANALYSIS OF VARIANCE FOR pH
All treatment combinations are included

| SOURCE | DF | SS | MS | F | P |
|---|---|---|---|---|---|
| Treatment (A) | 4 | 175.508 | 43.8770 | 2538.32 | 0.0000 |
| Week (B) | 13 | 79.1473 | 6.08825 | 352.21 | 0.0000 |
| Rep (C) | 4 | 0.13263 | 0.03316 | 1.92 | 0.1074 |
| A*B | 52 | 85.5962 | 1.64608 | 95.23 | 0.0000 |
| A*C | 16 | 0.99723 | 0.06232 | 3.61 | 0.0000 |
| B*C | 52 | 1.08561 | 0.02087 | 1.21 | 0.1790 |
| A*B*C | 208 | 3.59546 | 0.01728 | | |
| TOTAL | 349 | 346.062 | | | |
| Grand Average | 1 | 15292.3 | | | |

TABLE 3

LSD (T) PAIRWISE COMPARISONS OF MEANS
OF pH BY TREATMENT

| Treatment | Mean | Homogeneous Groups |
|---|---|---|
| Control | 7.2951 | I |
| Fert Only | 7.2630 | I |
| Humate | 6.9784 | . . I |
| Sulfur | 5.8561 | . . . . I |
| Sulfur-Humate | 5.6574 | . . . . . . I |
| Critical T Value | 1.971 | |
| Rejection Level | 0.050 | |

TABLE 3-continued

LSD (T) PAIRWISE COMPARISONS OF MEANS
OF pH BY TREATMENT

| Treatment | Mean | Homogeneous Groups |
|---|---|---|
| Critical Value for Comparison | 0.0438 | |
| Standard Error for Comparison | 0.0222 | |

Error term used: treatment*week*rep, 208 DF

TABLE 4

ANALYSIS OF VARIANCE FOR pH
Sulfur compared with sulfur-humate treatment

| Source | DF | SS | MS | F | P |
|---|---|---|---|---|---|
| Treatment (A) | 1 | 1.38205 | 1.38205 | 55.19 | 0.0000 |
| Week (B) | 13 | 162.565 | 12.5050 | 502.06 | 0.0000 |
| Rep (C) | 4 | 0.43356 | 0.10839 | 4.35 | 0.0041 |
| A*B | 13 | 0.24251 | 0.01865 | 0.75 | 0.7081 |
| A*C | 4 | 0.22968 | 0.05742 | 2.31 | 0.0705 |
| B*C | 52 | 1.33815 | 0.02573 | 1.03 | 0.4534 |
| A*B*C | 52 | 1.29519 | 0.02490 | | |
| Total | 139 | 167.486 | | | |
| Grand Average | 1 | 4639.68 | | | |

TABLE 5

LSD (T) PAIRWISE COMPARISONS OF MEANS
OF pH BY TREATMENT

| Treatment | Mean | Homogeneous Groups |
|---|---|---|
| Sulfur | 5.8561 | I |
| Sulfur-Humate | 5.6574 | . . I |
| Critical T Value | 2.007 | |
| Rejection Level | 0.050 | |
| Critical Value for Comparison | 0.0535 | |
| Standard Error for Comparison | 0.0266 | |

Error term used: treatment*week*rep, 52 DF

The sulfur-humate treatment indicated significantly lower pH than the sulfur only treatment ($p<0.001$), as well as compared to the humate, fertilizer only and control treatments.

Oxidized Lignite. The oxidized lignite employed in various embodiments of the present invention may be, for example, but not limited to, any lignite or brown coal of a variety of coal intermediate between peat and bituminous coal. The chemical composition and characteristic of lignite have been described in literature, for example *Encyclopedia of Chemical Technology*, Volume 14, Kirk-Othmer, and the *Journal of American Chemical Society*, Volume 69 (1947). Lignite has often been referred to as "brown coal", or "wood coal" since the texture of the original wood is distinct.

The *Encyclopedia of Chemical Technology*, (Vol. 14) by Kirk-Othmer points out that lignite is distinguishable from lignin. Lignin is a complex noncarbohydrate constituent obtained from wood, straw, corn stocks, or the like, and is substantially different chemically from the coal matter, lignite.

The lignitic material of various embodiments of the present invention contains appreciable quantities of humic plus fulvic acids. The richest common source of humic plus fulvic acids is the material known as oxidized lignite, which is generally a dark brown to black carbonaceous form of lignite. Leonardite refers to a particular deposit of oxidized lignite which occurs in North Dakota and which was used in early research. It is often misused when the broader term, oxidized lignite, which includes other deposits occurring in several areas of the world would be more descriptive. Oxidized lignite, which normally contains 15% to 30% moisture can be ground and dried to less than 20% moisture. Oxidized lignite in its natural form has few humic plus fulvic acid components that are soluble in water alone but becomes increasingly soluble as pH levels rise above its natural pH (3.3 to 4.0). Thus, oxidized lignite will dissolve naturally in higher pH environments, such as in soils and on plant leaf surfaces.

The humate material used in the various embodiments of the present invention preferably contains at least 35 wt. % on a dry basis of humic plus fulvic acids and their salts. More preferably, the oxidized lignitic material employed in the present invention contains from about 55% to about 80 wt. % on a dry basis of humic plus fulvic acids. Because of the variable nature of oxidized lignite, and other naturally occurring humic plus fulvic acid containing materials, a precise molecular structure of oxidized lignite is unknown. However, these materials (and humic acid) are well known to skilled artisans, and are available commercially.

Leonardite is actually a particular deposit of oxidized lignite in North Dakota; however, the mining and agricultural industry often uses the term "leonardite" in place of "oxidized lignite", which is technically more accurate. The term "leonardite", as used herein, refers to that particular deposit of oxidized lignite.

Humate. Humate is a blanket term used by the agricultural industry for any material used as a source of humic and fulvic acids. These materials include oxidized lignites, lignofulfonates, low energy coals, peat, organic soils, composted materials, organic marine and aquatic sediments, and organic surface layers of soils. So the term "humate", as used herein, refers to any source of humic and fulvic acids, rather than strictly as a salt of humic acid.

Humin. Humin comprises the portion of humate that is not soluble in acidic or basic solutions. Liquid extracts of oxidized lignite and/or other humic plus fulvic acid containing materials does not include humin. Humin does have value as a soil amendment because it holds water, absorbs fat-soluble compounds and reduces leaching of plant nutrient elements. Humin is usually black in color.

Humic acid. Humic acid comprises the portion of humate or soil humus that is soluble in 0.5N NaOH, but not soluble in an acid solution with a pH of less than 2.0. Humic acid is typically dark brown to black in color.

Fulvic acid. Fulvic acid comprises the portion of humate or soil humus that is soluble in both alkaline and acid solutions. Fulvic acid is usually light yellow to yellow-brown in color.

Dry, water-soluble humate. Dry, water-soluble humate comprises humic and fulvic acids extracted from raw oxidized lignite or other humic and fulvic acid containing material using a base, e.g., potassium hydroxide, followed by dewatering, e.g., evaporation.

Micronize. The term "micronize", as used herein refers to the process of reducing a material to a very fine powder, with the resulting particles being no larger 10 than microscopic size, which we define as having an average particle size of 50 microns or less. Generally, the smaller the particle, the greater the surface area. The greater the surface area of the material, the faster K will react with components in the soil. In one embodiment of this invention, the fine grinding was performed using a hammer mill; but includes the grinding of a material to an average particle size of 50 microns or less using other methods and/or machinery.

Naturally Occurring—the term "naturally occurring" as used herein, refers to materials or chemical compositions that are found in nature, or result from natural processes. Industrially synthesized materials or chemical compositions, with the exception of materials or chemical compositions that are also found in nature, are excluded.

Soil Amendment. The term "soil amendment" as used herein comprises any solid or liquid material, or combination thereof, such as lime, gypsum, sawdust, compost, compost tea, solid or liquid animal manures, crop residues, humates, etc. that is worked into the soil or applied on the surface, or placed in a band on the surface or in a band into the soil to enhance plant growth, or to enhance soil properties that indirectly enhance plant growth. Such benefits include, but are not limited to, growth stimulation, disease mitigation or suppression, nutrition, stress tolerance, protection against or increased tolerance to adverse environmental conditions, increased availability or uptake of plant nutrients, increased water holding capacity and reduced erosion hazard.

Binding Agent. The term "binding agent" as used herein refers to any solid or liquid material that when mixed with the materials to be formed into a pellet, prill, granule, or pastille, will cause the material to stick together when compressive forces are applied, or when the molten material or the binding agent is allowed to dry.

Autotrophic. Also known as lithotrophic, refers to the ability of an organism to get energy and nutrients from inorganic sources, using $CO_2$ as the sole carbon source. Chemoautotrophs get energy from the oxidation of inorganic materials, while photoautotrophs (plants) get energy from sunlight.

Heterotrophic. Refers to organisms that get energy from the oxidation of organic matter.

Compositions.

Overall, compositions of various embodiments, when in pastille form, contain from about 1% to about 40% by weight micronized oxidized lignite plus binding agent, preferably from about 10% to about 25%, more preferably from about 15% to about 25% of oxidized lignite plus binding agent, are within the scope of the present invention. The balance of the material contains elemental sulfur.

Uses

Various embodiments of the invention can be mixed and applied with other solid fertilizers without fear of negative chemical reactions. For example, the micronized humate-sulfur pastilles can be mixed with various ammonium polyphosphate fertilizers, and applied in a band to soils. The micronized humate-sulfur pastilles help to keep the phosphorus nutrient soluble to plants by lowering the pH and complexing the phosphorus.

No anti-caking additives are needed as long as the dry mix is kept dry. If exposure to ambient moisture (rain or drizzle) is anticipated, it is better to cover the mix with a plastic tarp than to try mixing in an anti-caking additive.

Toxicity

Various compositions of this invention contain no harsh chemical extractants; its humate is unaltered except for size, and the elemental sulfur has been unaltered, except for the heat added to melt it for the mixing and extrusion processes. In addition, the pastille composition of this embodiment has a pH very close to the native pH of the humate source, and toxic effects on humans, animals, soils and plants from spillage of the material are minimal. Toxic effects from the unintentional ingestion of small amounts of this material are also minimal.

EXAMPLE 2

The following example describes, in a non-limiting fashion, an embodiment of the present invention in more detail. As described, the composition of Example 2 comprises: approximately 20% oxidized lignite, which contains 70% humic and fulvic acids, and was mined from the Fruitland Formation which is about 40 miles (64 km) southwest of Cuba, N.Mex. The oxidized lignite was subsequently ground to less than or equal to approximately 0.25 in (0.63 cm).

Approximately 70% elemental sulfur, from Tiger Industries.

Approximately 10% bentonite, used as a binding agent.

According to an embodiment of the present invention, a micronized sulfur-humate pastille formulation is accomplished using the following procedure:

1. Provide dry oxidized lignite, milled to ¼" inch minus;
2. Grind the oxidized lignite in a hammer mill down until 100% will pass a 170 mesh screen (90 microns.)
3. Provide bentonite, added to the micronized humate as a binding agent.
4. Provide molten sulfur;
5. Mix ingredients listed above to create a hot slurry;
6. Force the slurry through tubes at a velocity that allows the slurry to drop out as discrete pellets, granules, or pastilles;
7. The pastilles are allowed to solidify by cooling.

According to various embodiments of the present invention, special application procedures are generally unnecessary.

The preceding examples can be repeated with similar success by substituting the generically or specifically described reactants and/or operating conditions of this invention for those used in the preceding examples.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A soil treatment composition, comprising:
   a granule including elemental sulfur, micronized humate, and a binding agent;
   wherein the ratio of micronized humate to elemental sulfur is about 1:4.
2. The composition of claim 1 wherein the micronized humate is an oxidized lignite ground to a particle size of 50 microns or less.
3. The composition of claim 1 wherein the binding agent is bentonite.
4. The composition of claim 2 wherein the binding agent is bentonite.
5. A method of soil acidification comprising applying the composition of claim 1 to soil.
6. The method of claim 5 wherein the composition is applied in a band.
7. The method of claim 6 wherein the composition is applied with other fertilizer materials.

* * * * *